United States Patent
Oren

(10) Patent No.: US 9,503,961 B2
(45) Date of Patent: Nov. 22, 2016

(54) SYSTEM AND METHOD FOR JOINING NEIGHBOR AWARENESS NETWORKING HIDDEN CLUSTERS

(71) Applicant: Intel Corporation, Santa Clara, CA (US)

(72) Inventor: Elad Oren, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 117 days.

(21) Appl. No.: 14/582,869

(22) Filed: Dec. 24, 2014

(65) Prior Publication Data
US 2016/0192273 A1 Jun. 30, 2016

(51) Int. Cl.
*H04W 40/24* (2009.01)
*H04W 48/16* (2009.01)
*H04W 56/00* (2009.01)

(52) U.S. Cl.
CPC ........... *H04W 40/244* (2013.01); *H04W 48/16* (2013.01); *H04W 56/00* (2013.01)

(58) Field of Classification Search
CPC H04W 40/244; H04W 48/16; H04W 56/004
USPC .................................................. 370/328, 329
See application file for complete search history.

(56) References Cited

U.S. PATENT DOCUMENTS

2015/0098388 A1* 4/2015 Fang ..................... H04W 48/18
370/328
2015/0200811 A1* 7/2015 Kasslin ................... H04L 41/12
370/254

* cited by examiner

*Primary Examiner* — Ronald B Abelson
(74) *Attorney, Agent, or Firm* — Schwabe, Williamson & Wyatt, P.C.

(57) ABSTRACT

Embodiments described herein relate generally to a communication between in a neighbor awareness networking (NAN) cluster. A first communication device may be participating in a hidden NAN cluster and a second communication device may seek to join the hidden NAN cluster. The second communication device may broadcast a discovery beacon that includes an identifier of the hidden NAN cluster in a field of the discovery beacon that is associated with a transmitter address. If the first communication device detects such a discovery beacon, the first communication device may transmit a synchronization beacon having timing information associated with the hidden NAN cluster. If the second communication device detects the synchronization beacon, the second communication device may synchronize with the hidden NAN cluster. Other embodiments may be described and/or claimed.

23 Claims, 8 Drawing Sheets

| FC 202 | Duration 204 | Receiver Address 206 | Transmitter Address 208 | Cluster ID 210 | Sequence Control 212 | Timestamp 214 | Beacon Interval 216 | Capability Information 218 | NAN IE(s) 220 | Frame Checksum 222 |
|---|---|---|---|---|---|---|---|---|---|---|
| 2 | 2 | 6 | 6 | 6 | 2 | 8 | 2 | 2 | Variable | 4 |

Octets

FIG. 2

SYSTEM AND METHOD FOR JOINING NEIGHBOR AWARENESS NETWORKING HIDDEN CLUSTERS

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

To communicate data, a computing device may request a resource that may be available at another computing device. For example, a computing device may execute a peer-to-peer ("P2P") application that may be adapted to consume a resource. With P2P, a device may operate as both a client and a server—that is, a device may both offer and request resources. Existing protocols, however, generally require one or more central servers to store mappings from textual resource descriptions to actual Internet protocol ("IP") addresses and ports at which those resources are available. The accessing an additional computing system to facilitate the communication of data between two computing devices may require significant overhead.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

FIG. 2 is a block diagram illustrating a discovery beacon that may be used to join a hidden neighbor awareness networking cluster, in accordance with various embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
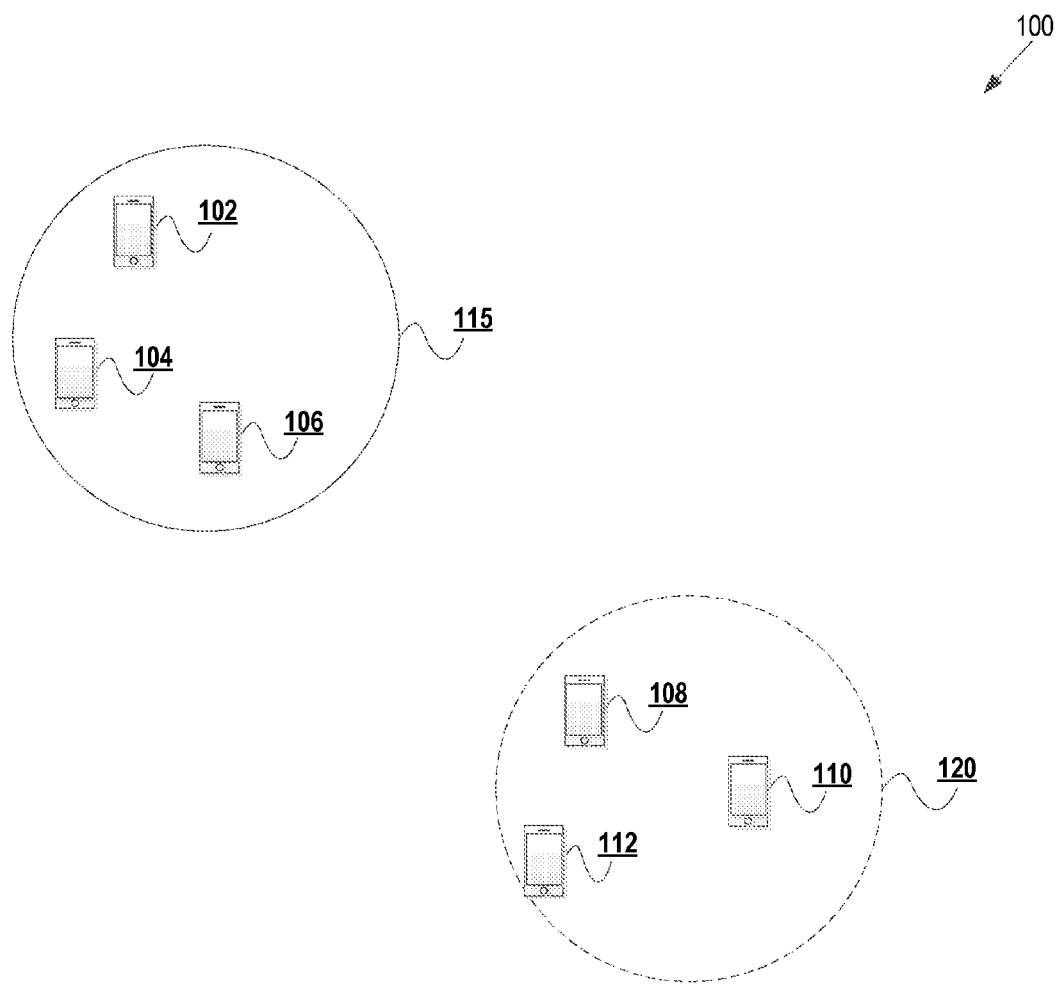
FIG. 1 is a block diagram illustrating an environment in which communication devices may join and/or participate in neighbor awareness networking clusters, in accordance with various embodiments

Beginning first with FIG. 1, a block diagram shows an environment 100 in which a plurality of communication devices 102-112 are adapted to share services and/or applications, in accordance with various embodiments. Each of the communication devices 102-112 may be any type of computing device equipped with broadband circuitry and configured to wireless communicate data, for example, according to one or more Institute of Electrical and Electronics Engineers (IEEE) 802.11 specifications. The communication devices 102-112 may be configured to communicate over one or more wireless local area networks (WLANs), such as Wi-Fi. For example, one of the communication devices 102-112 may be a cellular telephone, netbook, a tablet computer, a handheld computing device, a web-enabled appliance, a gaming device, a mobile phone, a smartphone, an eBook reader, a personal data assistant, a user equipment (UE), or the like. In another embodiment, one of the communication devices 102-112 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

In various embodiments, the communication devices 102-112 may be configured to communicate using Neighbor Awareness Networking (NAN), which may be associated with Wi-Fi Aware®. A standard and/or one or more specifications (e.g., a Wi-Fi specification) may define NAN and/or may delineate one or more protocols or other standards for communication of data between two or more of the computing devices 102-112 using NAN. In embodiments, an application at one of the communication devices 102-112 may discover another application or service at another one of the communication devices 102-112 using NAN. NAN may provide a low-powered service and/or application discovery that may be suitable to scale in dense Wi-Fi environments.

For one of the computing devices 102-112 to publish and/or subscribe to a service and/or application provided by another one of the computing devices 102-112, proximate communication devices (e.g., a first set of proximate communication devices 102-106 and a second set of proximate communication devices 108-112) may form NAN clusters 115, 120. Each of the NAN clusters 115, 120 may be a set first set of communication devices 102-106 or a second set of communication devices 108-112, respectively, that is synchronized to a same discovery window schedule, and where a discovery window may be a respective time and channel on which the first set of communication devices 102-106 or the second set of communication devices 108-112 converge. The NAN clusters 115, 120 may be formed and/or managed by respective ones of the communication devices 102-112 that function as respective Anchor Masters (AMs). For example, the first NAN cluster 115 may have a first AM 102 and the second NAN cluster 120 may have a second AM 108. An AM may be a communication device of a NAN cluster having a highest rank in the NAN cluster. A rank of one of the communication devices 102-112 may be based on one or more factors, for example, a stored value that indicates a preference of the one of the communication devices 102-112 to serve as an AM, a random value, and/or an address of the one of the communication devices 102-112 (e.g., a Media Access Control (MAC) address).

In order to find a cluster, a first communication device 102 may passively scan a channel (e.g., a channel associated with NAN communication) to detect a discovery beacon. The discovery beacon may be transmitted (e.g., broadcast) by another communication device (e.g., an AM or another communication device, such as a communication device that may have a master role but is not the AM). If the first communication device 102 is unable to detect a discovery beacon, the first communication device 102 may form the first NAN cluster 115 (e.g., the first communication device 102 may become an AM of the first NAN cluster 115).

The first communication device 102 may transmit (e.g., broadcast) one or more discovery beacons that may be detected by other proximate communication devices 104, 106. The discovery beacon transmitted by the first communication device 102 for the first NAN cluster 115 may include a field associated with a receiver address (e.g., a broadcast address), a field associated with a transmitter address (e.g., a MAC address of the first communication device 102), a field associated with an identifier of a NAN cluster (e.g., an identifier of the first NAN cluster 115), and a field associated with timing information (e.g., timing information associated with synchronization with the first NAN cluster 115). Upon detection of the discovery beacon, the other communication devices 104, 106 may synchronize based on timing information for the first NAN cluster 115, as indicated in the discovery beacon.

For data exchange in the first NAN cluster 115 or the second NAN cluster 120, the first set of communication devices 102-106 and/or the second set of communication devices 108-112 may exchange service discovery frames (SDFs), for example, to indicate Publish, Subscribe, and/or Follow-Up. SDFs may be action frames sent by a communication device 102-112 to publish a service and/or application, to subscribe to a published service and/or application, and/or to communicate data associated with publication and/or subscription.

In some embodiments, the SDFs may be non-protected frames and may not necessarily offer privacy to a communication device 102-112 communicating using NAN. In some embodiments, one or the communication devices 102-112 may change an address (e.g., a MAC address) used for communicating in one of the NAN clusters 115, 120. While changing the address of the one of the communication device 102-112 may prevent disclosure of a device, data exchanged using NAN (e.g., SDFs) may still be exposed.

In some embodiments, the second NAN cluster 120 may be a hidden NAN cluster. Communication devices 108-112 included in the hidden NAN cluster 120 may prevent other communication devices from joining the hidden NAN cluster 120 by not advertising (e.g., broadcasting) discovery beacons that include information associated with the hidden NAN cluster 120. For example, the absence of discovery beacons that advertise timing information that may be used to synchronize with the hidden NAN cluster 120 may prevent other communication devices from joining the hidden NAN cluster 120.

In order to join the hidden NAN cluster 120, one of the communication devices 108-112 may have stored therein information associated with the hidden NAN cluster 120 that may be used for joining the hidden NAN cluster 120. For example, a communication device 110 that wishes to join the hidden NAN cluster 120 may have stored therein an identifier (e.g., a value) of the hidden NAN cluster 120—e.g., an application at the joining communication device 110 may include a cluster identifier to be used for joining the hidden NAN cluster 120.

To join the hidden NAN cluster 120, the joining communication device 110 may use a discovery beacon but may include different information in different fields than a discovery beacon used to advertise a NAN cluster and/or form a NAN cluster. For example, the first communication device 102 may form the first NAN cluster 115 by transmitting a discovery beacon having its MAC address in a field of the discovery beacon associated with the transmitter address and an identifier of the first NAN cluster 115 in a field associated with a NAN cluster identifier, whereas the joining communication device 110 may join the hidden NAN cluster 120 by including an identifier of the hidden NAN cluster 120 in a different field (e.g., in the field associated with the transmitter address) of a discovery beacon. Further, the joining communication device 110 may include an arbitrary (e.g., random) value in the field of a discovery beacon associated with the NAN cluster identifier, and one or more fields of the discovery beacon associated with timing information may include a time period at which the joining communication device 110 is configured to receive data so that it may join the hidden NAN cluster 120.

In embodiments, the joining communication device 110 may transmit (e.g., broadcast) such a discovery beacon for joining a hidden cluster. If another communication device were to detect that discovery beacon for joining a hidden cluster, the other communication device may be unable to use that discovery beacon to join a hidden NAN cluster, for example, because the transmitter address and/or a NAN cluster identifier are not in expected fields and/or because timing information in the discovery beacon does not correspond to timing information for a hidden NAN cluster but corresponds to timing information that the joining communication device 110 may expect to receive timing information for joining the hidden NAN cluster 120.

A communication device 108 participating in the hidden NAN cluster 120 may be configured to passively scan a channel (e.g., a NAN channel) for discovery beacons. If the participating communication device 108 detects a discovery beacon transmitted by the joining communication device 110, the participating communication device 108 may be configured to determine that the joining communication device 110 is to be provided synchronization information for joining the hidden NAN cluster 120. For example, the participating communication device 108 may be configured to detect the discovery beacon from the joining communication device 110 by passively scanning a NAN channel, detect the identifier of the hidden NAN cluster 120 in the field of the discovery beacon that is associated with a transmitter address, and determine that the joining communication device 110 is to be provided information for synchronizing with the hidden NAN cluster 120 based on the detection that the identifier of the hidden NAN cluster 120 appears in the field associated with the transmitter address.

Based on the discovery beacon from the joining communication device 110, the participating communication device 108 may transmit a synchronization beacon to the joining communication device 110. In embodiments, the synchronization beacon may include information associated with the hidden NAN cluster 120. For example, the synchronization beacon may include timing information for exchanging data (e.g., SDFs) in the hidden NAN cluster 120 and/or an address (e.g., a MAC address) of the participating communication device 108.

In some embodiments, the participating communication device 108 may broadcast the synchronization beacon (or another action frame that includes timing information associated with the hidden NAN cluster 120). The participating communication device 108 may transmit the synchronization beacon according to timing information included in the discovery beacon, such as a time period at which the joining communication device 110 expects to receive a synchronization beacon.

In embodiments, the joining communication device 110 may receive the synchronization beacon (or another action frame that includes timing information associated with the hidden NAN cluster 120), for example, according to timing information indicated in the discovery beacon. From the synchronization beacon, the joining communication device 110 may adjust circuitry (e.g., radio-frequency (RF) circuitry) to communicate data according to timing information indicated in the synchronization beacon, such as a time period or interval at which SDFs are to be exchanged in the hidden NAN cluster 120.

According to one embodiment, a communication device 112 may search for a hidden NAN cluster 120. However, the searching communication device 112 may not be sufficiently proximate to a participating communication device 108 to transmit a discovery beacon to and/or receive a synchronization beacon from the participating communication device 108. The searching communication device 112 may be configured to transmit a plurality of discovery beacons in an attempt to join the hidden NAN cluster 120, but if the searching communication device 112 does not receive a synchronization beacon within a predetermined period of time, the searching communication device 112 may cease transmission of discovery beacons. In some embodiments, the searching communication device 112 may begin its own hidden NAN cluster (e.g., a hidden NAN cluster of only the one communication device 112).

With respect to FIG. 2, a block diagram illustrates a format of a discovery beacon 200 that may be associated with joining NAN clusters. One or more of the communication devices 102-112 of FIG. 1 and described herein may transmit the discovery beacon 200. The discovery beacon 200 may be comprised of a plurality of fields 202-214. Each of the fields 202-214 may be of a size of one or more octets.

The discovery beacon 200 may be of a format so that specific fields are associated with specific information. In various embodiments, a first field 202 may be a frame control field, a second field 204 may be associated with a duration of a frame in which the discovery beacon 200 is to be included, a third field 206 may be associated with a receiver address (e.g., a broadcast address), a fourth field 208 may be associated with a transmitter address (e.g., a MAC address of a transmitting communication device), a fifth field 210 may be associated with an identifier of a NAN cluster, a sixth field 212 may be a sequence control field, a seventh field 214 may include a timestamp, an eighth field 216 may correspond to a beacon interval (e.g., a number of time units corresponding to the time between discovery beacon transmissions), a ninth field 218 associated with capability information (e.g., spectrum management, quality of service (QoS), automatic power save delivery (APSD), radio measurement, delayed block acknowledgement, intermediate block acknowledgement, and/or other similar information), a tenth field 220 associated with one or more NAN information elements (e.g., timing information), and/or an eleventh field 222 associated with frame checksum.

In various embodiments, a NAN cluster that is not hidden may be advertised by a communication device using the discovery beacon 200. To advertise the NAN cluster, a communication device may generate the discovery beacon 200 to include appropriate values in corresponding fields—e.g., a discovery beacon to advertise a NAN cluster may include a MAC address of the transmitting communication device in the fourth field 208 and an identification value of the advertised NAN cluster in the fifth field 210. Accordingly, another communication device may join the advertised NAN cluster based on the discovery beacon 200.

In another embodiment, a communication device may use the discovery beacon 200 to join a hidden NAN cluster. That is, the communication device may generate the discovery beacon 200 to include values in fields that may be recognizable by another communication device in the hidden NAN cluster, but another communication device would be unable to join the hidden NAN cluster based on the discovery beacon itself. In various embodiments, a joining communication device may generate the discovery beacon 200 to include an identification value of the hidden NAN cluster in the fourth field 208 that is associated with a transmitter address. In some embodiments, a communication device may generate the discovery beacon 200 to include a random value in the field 210 associated with an identifier of a NAN cluster. In some embodiments, the communication device may include timing information at which the communication device is to receive a synchronization beacon, such as an information element associated with timing information in the tenth field 220 (e.g., a value associated with a timing synchronization function (TSF) timer) and/or a timestamp in the seventh field 214.

When another communication device that is participating in the hidden NAN cluster detects the discovery beacon, the other communication device may be recognize that the identification value of the hidden NAN cluster as appearing in a field of the discovery beacon 200 other than the field 210 associated with a cluster identifier. Based on this recognition, the other communication device may transmit (e.g., broadcast) synchronization information (e.g., a synchronization beacon) so that the communication device may join the hidden NAN cluster.

Figure 3:
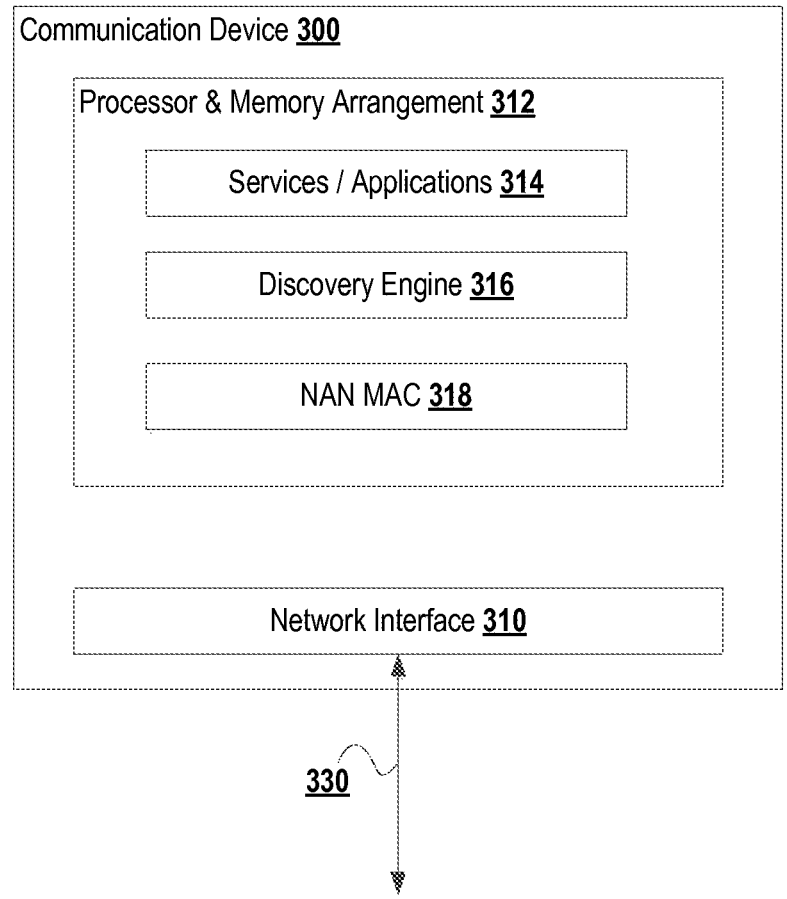
FIG. 3 is a block diagram illustrating a communication device that may join and/or participate in a hidden neighbor awareness networking cluster, in accordance with various embodiments.

With respect to FIG. 3, a block diagram illustrates an exemplary communication device 300 configured to join and/or or participate in a hidden NAN cluster, in accordance with various embodiments. The communication device 300 may be an embodiment of one of the communication devices 102-112, as illustrated in FIG. 1 and described herein.

The communication device 300 may include a processor and memory arrangement 312. The processor and memory arrangement 312 is intended to represent a broad range of processor and memory arrangements including, but not limited to, arrangements with single or multi-core processors of various execution speeds and power consumptions, and memory of various architectures with one or more levels of caches, and of various types, such as dynamic random access, FLASH, and so forth.

The processor and memory arrangement 312 may comprise storage circuitry. Storage circuitry may include one or more machine- (e.g., a computer-) readable storage media, such as read only memory (ROM), random access memory (RAM), magnetic disk storage media, optical storage media, and/or flash memory devices.

The processor and memory arrangement 312 may be communicatively coupled with a network interface 310. The network interface 310 may include circuitry adapted to transmit and/or receive signals over a network (e.g., transmitter circuitry and/or receiver circuitry). The network interface 310 may be configured to communicate signals across various types of wired and/or wireless networks, such as a radio network, a WLAN, a fiber optic network, and/or other networks. For example, the network interface 310 may include radio circuitry configured to operate in conformance with one or more IEEE 802.11 specifications. Accordingly, the network 330 is intended to represent a broad range of networks known in the art. Examples of a network 330 may include wired or wireless, local or wide area, private or public networks, including the Internet.

The processor and memory arrangement 312 may have loaded therein one or more services and/or applications 314, a discovery engine 316, and/or a NAN MAC layer 318 (e.g., circuitry associated with a MAC layer and NAN operations thereat). The services and/or applications 314 are intended to represent a broad range of service and/or applications, which may be known in the art. In embodiments, one of the services and/or applications 314 may subscribe to and/or be published to another communication device, such as by subscribing to another service and/or application at another communication device and/or by publishing so that another service and/or application at another communication device may subscribe thereto.

In some embodiments, one of the services and/or applications 314 may be associated with an identifier of a hidden NAN cluster that the communication device 300 is to join for publication and/or subscription. For example, one of the services and/or applications 314 may include an identifier of a hidden NAN cluster in which the communication device 300 is to join so that the one of the services and/or applications 314 may subscribe to and/or publish to another service and/or application at another communication device.

One or more of the services and/or applications 314 may be coupled with a discovery engine 316. In various embodiments, the discovery engine 316 may provide an interface to one or more of the services and/or applications 314 for NAN communication.

In embodiments, the discovery engine 316 may perform operations associated with joining a hidden NAN cluster. For example, the discovery engine 316 may perform operations associated with generation of a discovery beacon for joining a hidden NAN cluster. In various embodiments, the discovery engine 316 may be configured to generate a discovery beacon that includes an identifier (e.g., a value) of a hidden NAN cluster in a field of the discovery beacon that is not associated with cluster identification—e.g., the discovery engine 316 may include the hidden NAN cluster identifier in a field of a discovery beacon associated with a transmitter address (e.g., the field that is to indicate a MAC address of the transmitting device).

The discovery engine 316 may include other values in the discovery beacon. For example, the discovery engine 316 may include a random value in the field that is associated with an identifier of a NAN cluster. Further, the discovery engine 316 may include timing information that indicates a discovery window at which the communication device 300 is configured to transmit and/or receive data using NAN. In one embodiment, the timing information may not explicitly indicate the discovery window of the communication device 300, but may be used to determine a time at which the communication device 300 is to transmit and/or receive data—e.g., the timing information may be a timestamp.

The discovery engine 316 may cause one or more discovery beacons to be transmitted. In one embodiment, the discovery engine 316 may cause a plurality of discovery beacons to be transmitted according to a predetermined interval. The discovery engine 316 may cease transmission of discovery beacons upon reception of a synchronization beacon.

In various embodiments, the discovery engine 316 may cease transmission of discovery beacons if no synchronization beacon has been received within a predetermined time period. In one embodiment, the communication device 300 may begin its own hidden NAN cluster (e.g., a hidden NAN cluster that the communication device 300 does not advertise using discovery beacons).

Based on a discovery beacon transmitted to join a hidden NAN cluster, the discovery engine 316 may process (e.g., through the network interface 310 and the NAN MAC 318) a synchronization beacon from another communication device that is participating in the hidden NAN cluster. In various embodiments, the synchronization beacon may be received at a discovery window, which may have been indicated to the other communication device in the discovery beacon (e.g., timing information in the discovery beacon may implicitly indicate the discovery window of the communication device 300).

The discovery engine 316 may be configured to recognize the identifier of the hidden NAN cluster in the synchronization beacon. Based on the synchronization beacon, the discovery engine 316 may be configured to synchronize with the hidden NAN cluster so that the communication device 300 may communicate in the hidden NAN cluster). In one embodiment, the discovery engine 316 may be configured to adjust its discovery window to synchronize with the discovery window of the hidden NAN cluster, for example, based on timing information (e.g., a value associated with a TSF timer and/or a timestamp) included in the synchronization beacon.

In embodiments, the discovery engine 316 may perform operations associated with facilitating the addition of another communication device to a hidden NAN cluster, such as where the communication device 300 is already participating in a hidden NAN cluster. For example, the discovery engine 316 may perform operations associated with processing a discovery beacon for joining the hidden NAN cluster that is received from the other communication device. However, the discovery engine 316 may not transmit discovery beacons associated with the hidden NAN cluster because hidden NAN clusters may not be advertised.

In various embodiments, the discovery engine 316 may cause the communication device 300 to scan a channel (e.g., a NAN channel) for discovery beacons. The discovery engine 316 may cause the communication device 300 to passively scan the channel and/or scan the channel at a predetermined interval (e.g., a twenty second interval). Based on the scanning, the discovery engine 316 may detect a discovery beacon (e.g., a beacon with a beacon interval equal to 100 time units).

Upon detection of a discovery beacon, the discovery engine 316 may determine if the discovery beacon indicates that synchronization information for the hidden NAN cluster should be transmitted so that another communication device may join the hidden NAN cluster. In various embodiments, the discovery engine 316 may be configured to detect the identifier (e.g., the value) of the hidden NAN cluster in another field of the discovery beacon that is not associated with cluster identification—e.g., the discovery engine 316 may detect the hidden NAN cluster identifier in a field of a discovery beacon associated with a transmitter address (e.g., the field that is to indicate a MAC address of the transmitting device). Based on the detection of the hidden NAN cluster identifier in the other field of the discovery beacon, the discovery engine 316 may cause a synchronization beacon to be transmitted (e.g., broadcast).

In various embodiments, the discovery engine 316 may generate a synchronization beacon (or another action frame that includes timing information associated with the hidden NAN cluster) associated with the hidden NAN cluster that includes the identifier of the hidden NAN cluster (e.g., in a field associated with an identifier of a NAN cluster). The discovery engine 316 may generate the synchronization beacon to include timing information associated with the hidden NAN cluster. In some embodiments, the timing information may include a timestamp and/or a value associated with a TSF timer, such as a TSF timer at an AM of the hidden NAN cluster. The other communication device may use that timing information to synchronize with the hidden NAN cluster (e.g., adjust a discovery window based on the timing information).

In various embodiments, the discovery engine 316 may detect timing information associated with the other communication device in the discovery beacon. In one embodiment, this timing information associated with the other communication device may be associated with a current discovery window at the other communication device and/or may be associated with a TSF timer at the other communication device. In some embodiments, the discovery engine 316 may detect the timing information associated with the other communication device based on a time at which the discovery beacon is received by the communication device 300. The discovery engine 316 may cause the communication device 300 to transmit (e.g., broadcast) the synchronization beacon based on this timing information associated with the other communication device.

In various embodiments, the discovery engine 316 may schedule a time slot at which to transmit the synchronization beacon. In various embodiments, this scheduled time slot may be associated with a Further Availability MAP Attribute and/or a Further NAN Service Discovery Attribute. This scheduled time slot may not overlap in time with a discovery window in which the communication device 300 is to communicate in the hidden NAN cluster.

In various embodiments, the NAN MAC 318 may be responsible for obtaining and maintaining synchronization in a NAN cluster in which the communication device 300 is to join and/or participate. Accordingly, the NAN MAC 318 may operate a timing synchronization function (TSF) timer. The NAN MAC 318 may cooperate with the discovery engine 316 to set and/or adjust the TSF timer, for example, based on timing information included in a synchronization beacon.

In various embodiments, the NAN MAC 318 may process SDFs and/or frames associated with discovery beacons and/or synchronization beacons. Further, the NAN MAC 318 may provide frame transmit and receive services to the discovery engine 316. In the transmit direction, the NAN MAC 318 may contend for access at a discovery window.

Figure 4:
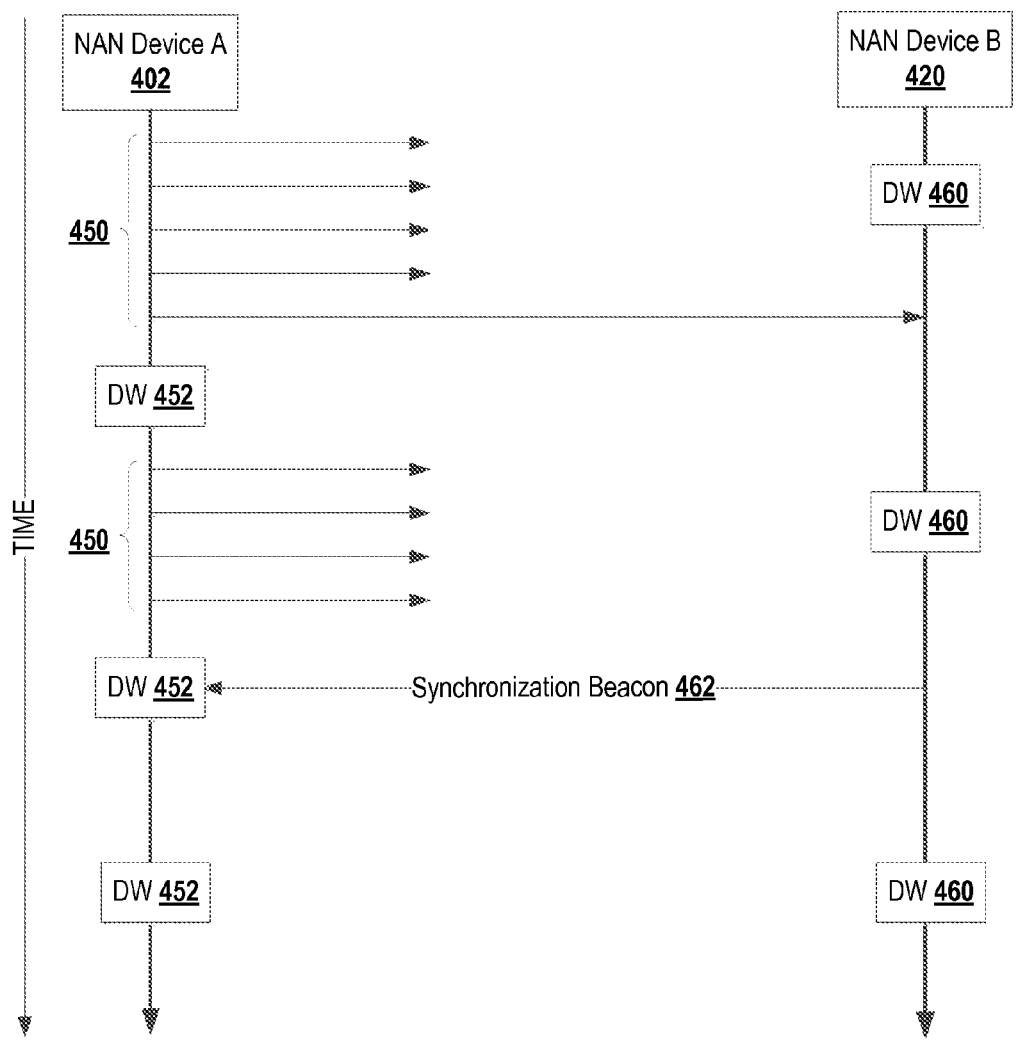
FIG. 4 is a sequence diagram illustrating systems and operations for joining a hidden neighbor awareness networking cluster, in accordance with various embodiments.

With respect to FIG. 4, a sequence diagram illustrates systems and operations for joining a hidden NAN cluster, in accordance with various embodiments. The NAN device A 402 and the NAN device B 420 may be embodiments of the communication devices 102-112 of FIG. 1 and described herein. The NAN device A 402 may be searching to join a hidden NAN cluster, whereas the NAN device B 420 may be a member of the hidden NAN cluster.

The NAN device A 402 and the NAN device B 420 may have respective discovery windows 452, 460. A discovery window may be a time and channel on which NAN devices converge. During a discovery window the NAN devices are available with high probability for mutual discovery. During interim periods the NAN devices may be asleep or involved with other activities, for example, communicating on other networks, possibly on a different channel. Before the NAN device A 402 joins the hidden NAN cluster, the discovery window 452 of the NAN device A 402 may not synchronously occur with the discovery window 460 of the NAN device B 420.

The NAN device A 402 may generate a plurality of discovery beacons 450 that each includes an identifier of a hidden NAN cluster that the NAN device A 402 wishes to join. The hidden NAN cluster identifier may be included in respective fields of the discovery beacons 450 that are associated with a different type of value, such as a transmitter address. In some embodiments, the discovery beacons 450 may include a random values in respective fields associated with an identifier of a NAN cluster.

The NAN device A 402 may transmit discovery beacons 450 until it receives a synchronization beacon (or another action frame that includes timing information associated with the hidden NAN cluster) for the hidden NAN cluster or until a predetermined period of time has elapsed (at which point, the NAN device A 402 may operate its own hidden NAN cluster).

The NAN device B 420 may be passively scanning a NAN channel and may detect one or more of the discovery beacons 450. The NAN device B 420 may detect the hidden cluster identifier in another field of one of the discovery beacons (e.g., a field associated with a transmitter address) and may recognize that another communication device seeks to join the hidden NAN cluster.

Based on the detection of the hidden NAN cluster identifier, the NAN device B may schedule a time slot that is targeted at the discovery window 452 of the NAN device A 402. This time slot may be associated with a Further NAN Availability Map attribute and/or a Further NAN Service Discovery Attribute. The NAN device B 420 may target this time slot to the discovery window 452 of the NAN device A 402 based on timing information included in one of the discovery beacons 450 detected by the NAN device B 420. The scheduling of this time slot may cause the NAN device B 420 to be available at a specific time that is outside of the timing of the discovery window 460 associated with the hidden NAN cluster in which the NAN device B 420 is participating.

The NAN device B 420 may be available during the scheduled time slot (outside its own discovery window 460), for example, for sixteen time units. Appearing in the discovery window 452 of the NAN device A 402, the NAN device B 420 may transmit a synchronization beacon (or another action frame that includes timing information associated with the hidden NAN cluster) 462 associated with the hidden NAN cluster. The synchronization beacon 462 may include the hidden NAN cluster identifier. The synchronization beacon 462 may include timing information associated with the hidden NAN cluster, such as an indication of a time at which discovery windows of the hidden NAN cluster are to occur and/or a timestamp.

The NAN device A 402 may receive the synchronization beacon 462 at its discovery window 452. The NAN device A 402 may cease transmission of discovery beacons 450 in response to the synchronization beacon 462. Based on the synchronization beacon 462, the NAN device A 402 may join the hidden NAN cluster. The NAN device A 402 may adjust its discovery window 452 based on the timing information included in the synchronization beacon 462. This adjustment may synchronize the discovery window 452 of the NAN device A 402 with the discovery window of the NAN device B 420 in the hidden NAN cluster.

Figure 5:
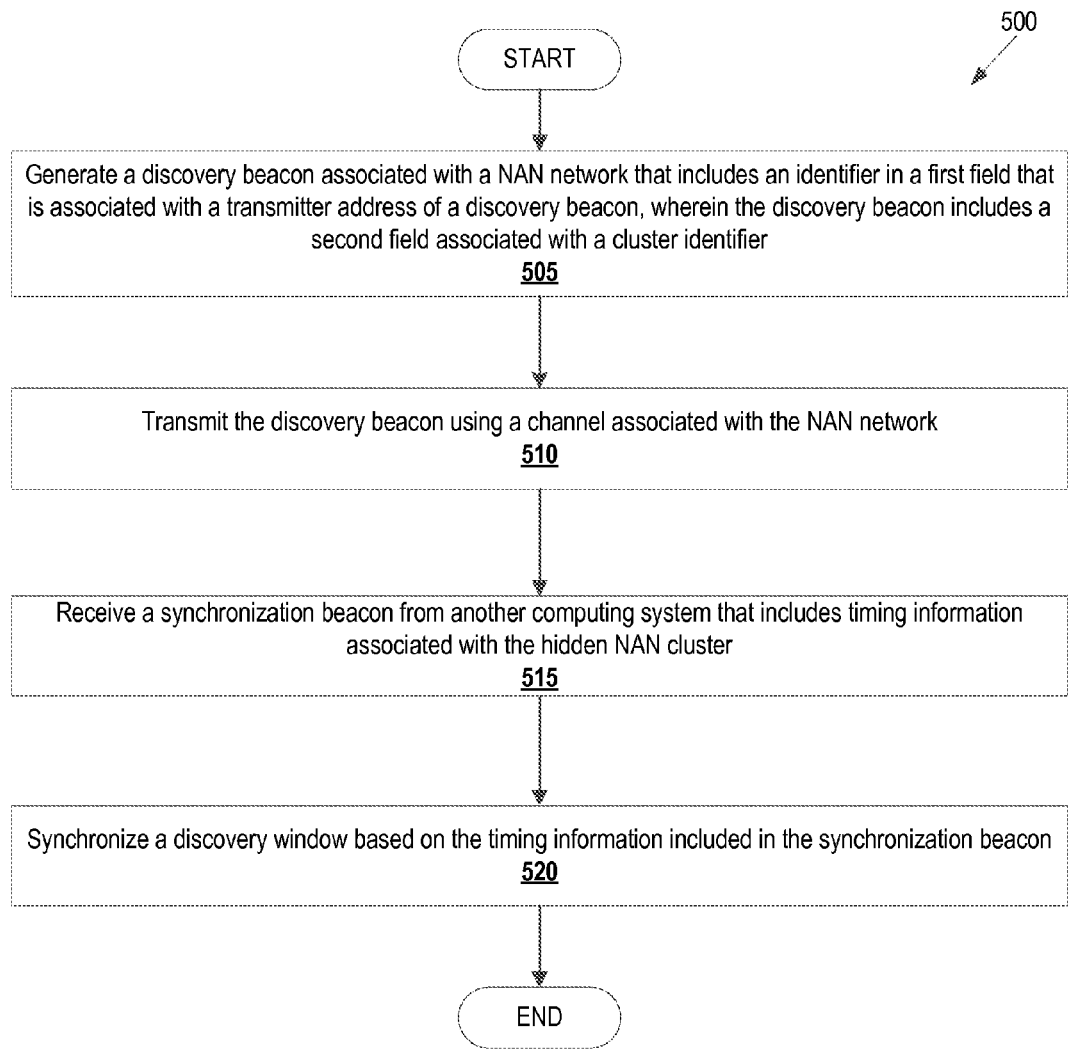
FIG. 5 is a flow diagram illustrating a method for joining a hidden neighbor awareness networking cluster, in accordance with various embodiments.

Turning to FIG. 5, a flow diagram illustrates a method 500 for joining a hidden NAN cluster, in accordance with various embodiments. The method 500 may be performed by a communication device, such as one of the communication devices 102-112 of FIG. 1 and described herein. While FIG. 5 illustrates a plurality of sequential operations, one of ordinary skill would understand that one or more operations of the method 500 may be transposed and/or performed contemporaneously.

To begin, the method 500 may include operation 505 for generating a discovery beacon associated with a NAN network. The discovery beacon may include a plurality of fields, including a field associated with an identifier of a NAN cluster and a field associated with a transmitter address (e.g., a MAC address of a communication device that is to transmit the discovery beacon). The discovery beacon may be generated to include an identifier associated with a hidden NAN cluster in a field that is not associated with an identifier of a NAN cluster. In some embodiments, the discovery beacon may be generated to include the hidden NAN cluster identifier in the field associated with a transmitter address. In some embodiments, the discovery beacon may be generated to include a random value in the field associated with an identifier of a NAN cluster.

At operation 510, the method 500 may include transmitting the discovery beacon using a channel associated with the NAN network. The discovery beacon may be broadcast. A plurality of discovery beacons may be broadcast, for example, until a synchronization beacon is received or until a predetermined period of time has elapsed.

Based on at least one discovery beacon, operation 515 may include receiving a synchronization beacon (or another action frame that includes timing information associated with the hidden NAN cluster) from another computing system that includes timing information associated with the hidden NAN cluster. Operation 520 may include synchronizing a discovery window based on the timing information included in the synchronization beacon.

Figure 6:
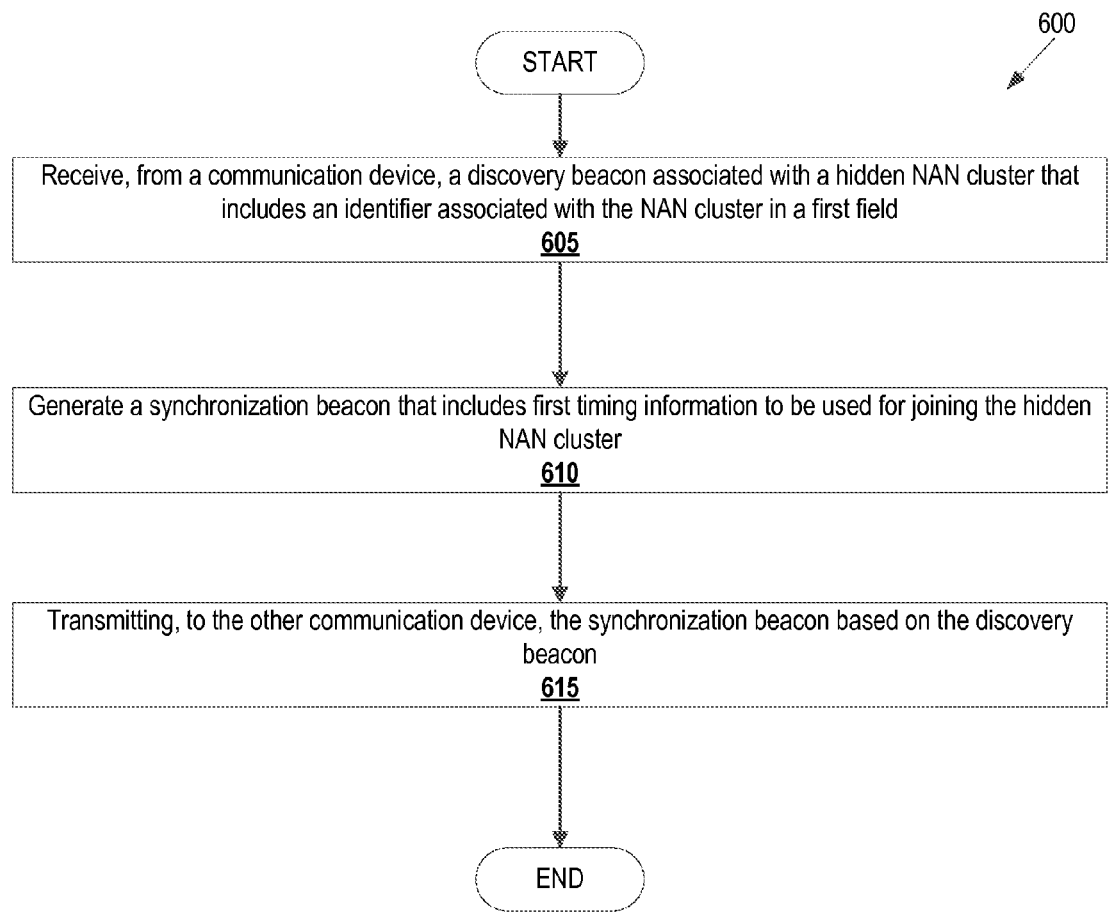
FIG. 6 is a flow diagram illustrating a method for facilitating the addition of another communication device to a hidden neighbor awareness networking cluster, in accordance with various embodiments.

In reference to FIG. 6, a flow diagram illustrates a method 600 for facilitating the addition of another communication device to a hidden NAN cluster, in accordance with various embodiments. The method 600 may be performed by a communication device, such as one of the communication devices 102-112 of FIG. 1. While FIG. 6 illustrates a plurality of sequential operations, one of ordinary skill would understand that one or more operations of the method 600 may be transposed and/or performed contemporaneously.

To begin, the method 600 may include operation 605 for receiving, from a communication device, a discovery beacon associated with a hidden NAN cluster. The discovery beacon may include an identifier of the hidden NAN cluster in a first field. The discovery beacon may include a plurality of fields, including a field associated with an identifier of a NAN cluster and a field associated with a transmitter address (e.g., a MAC address of a communication device that is to transmit the discovery beacon). The discovery beacon may include an identifier associated with the hidden NAN cluster in a field that is not associated with an identifier of a NAN cluster. In some embodiments, the discovery beacon may include the hidden NAN cluster identifier in the field associated with a transmitter address.

Based on the discovery beacon having the hidden NAN cluster identifier, operation 610 may include generating a synchronization beacon that includes timing information to be used for joining the hidden NAN cluster. Operation 615 may include transmitting the synchronization beacon. In embodiments, the synchronization beacon may be broadcast. In various embodiments, the synchronization beacon may be transmitted based on timing information (e.g., a timestamp) included in the discovery beacon.

Figure 7:
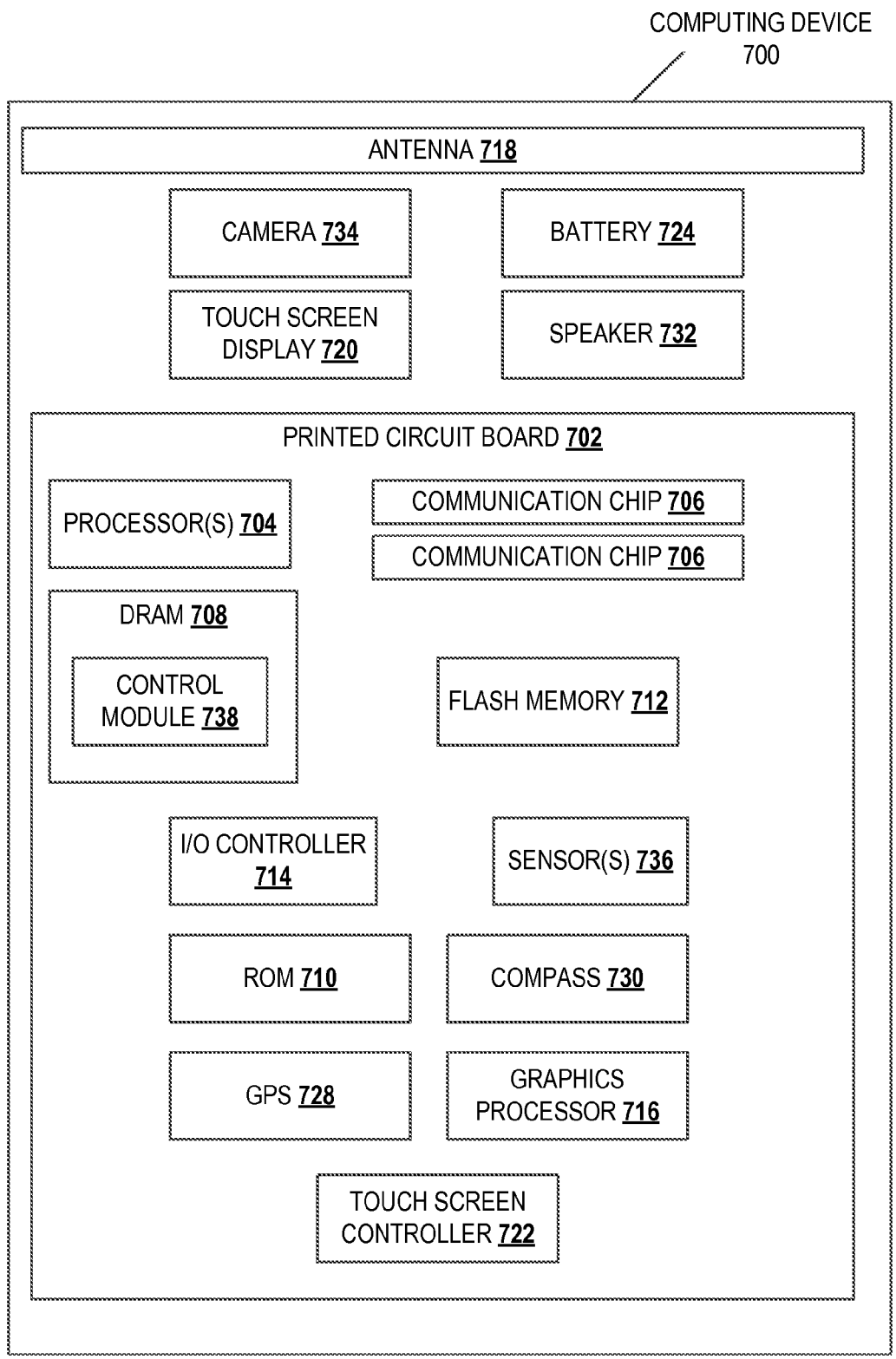
FIG. 7 is a block diagram illustrating a computing device adapted to operate in a communication network, in accordance with various embodiments.

Now with reference to FIG. 7, a block diagram illustrates an example computing device 700, in accordance with various embodiments. The element manager 105 and/or one of the communication devices 102-112 of FIG. 1 and described herein may be implemented on a computing device such as computing device 700. Further, the computing device 700 may be adapted to perform one or more operations of the method 500 described with respect to FIG. 5 and/or the method 600 described with respect to FIG. 6. The computing device 700 may include a number of components, one or more processors 704, and one or more communication chips 706. Depending upon the embodiment, one or more of the enumerated components may comprise "circuitry" of the computing device 700, such as processing circuitry, communication circuitry, and the like. In various embodiments, the one or more processor(s) 704 each may be a processor core. In various embodiments, the one or more communication chips 706 may be physically and electrically coupled with the one or more processor(s) 704. In further implementations, the communication chips 706 may be part of the one or more processor(s) 704. In various embodiments, the computing device 700 may include a printed circuit board (PCB) 702. For these embodiments, the one or more processor(s) 704 and communication chip 706 may be disposed thereon. In alternate embodiments, the various components may be coupled without the employment of the PCB 702.

Depending upon its applications, the computing device 700 may include other components that may or may not be physically and electrically coupled with the PCB 702. These other components include, but are not limited to, volatile memory (e.g., dynamic random access memory 708, also referred to as "DRAM"), non-volatile memory (e.g., read only memory 710, also referred to as "ROM"), flash memory 712, an input/output controller 714, a digital signal processor (not shown), a crypto processor (not shown), a graphics processor 716, one or more antenna(s) 718, a display (not shown), a touch screen display 720, a touch screen controller 722, a battery 724, an audio codec (not shown), a video code (not shown), a global navigation satellite system 728, a compass 730, an accelerometer (not shown), a gyroscope (not shown), a speaker 732, a camera 734, one or more sensors 736 (e.g., a barometer, Geiger counter, thermometer, viscometer, rheometer, altimeter, or other sensor that may be found in various manufacturing environments or used in other applications), a mass storage device (e.g., a hard disk drive, solid state drive, compact disk and drive, digital versatile disk and drive, etc.) (not shown), and the like. In various embodiments, the one or more processor(s) 704 may be integrated on the same die with other components to form a system on a chip (SOC).

In various embodiments, volatile memory (e.g., DRAM 708), non-volatile memory (e.g., ROM 710), flash memory 712, and the mass storage device (not shown) may include programming instructions configured to enable the computing device 700, in response to the execution by one or more processor(s) 704, to practice all or selected aspects of the data exchanges and methods described herein, depending on the embodiment of the computing device 700 used to implement such data exchanges and methods. More specifically, one or more of the memory components (e.g., DRAM 708, ROM 710, flash memory 712, and the mass storage device) may include temporal and/or persistent copies of instructions that, when executed by one or more processor(s) 704, enable the computing device 700 to operate one or more modules (e.g., control module 738) configured to practice all or selected aspects of the data exchanges and method described herein, depending on the embodiment of the computing device 700 used to implement such data exchanges and methods.

The communication chips 706 may enable wired and/or wireless communication for the transfer of data to and from the computing device 700. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 706 may implement any of a number of wireless standards or protocols, including but not limited to LTE, LTE-A, Institute of Electrical and Electronics Engineers (IEEE) 702.20, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data Rates for GSM Evolution (EDGE), Code Division Multiple Access (CDMA), Time Division Multiple Access (TDMA), Digital Enhanced Cordless Telecommunications (DECT), Bluetooth, derivatives thereof, as well as other wireless protocols that are designated as 3G, 4G, 5G, and beyond. The computing device 700 may include a plurality of communication chips 706 adapted to perform different communication functions. For example, a first communication chip 706 may be dedicated to shorter range wireless communications, such as Wi-Fi and Bluetooth, whereas a second communication chip 706 may be dedicated to longer range wireless communications, such as GPS, EDGE, GPRS, CDMA, WiMAX, LTE, LTE-A, Ev-DO, and the like.

Figure 8:
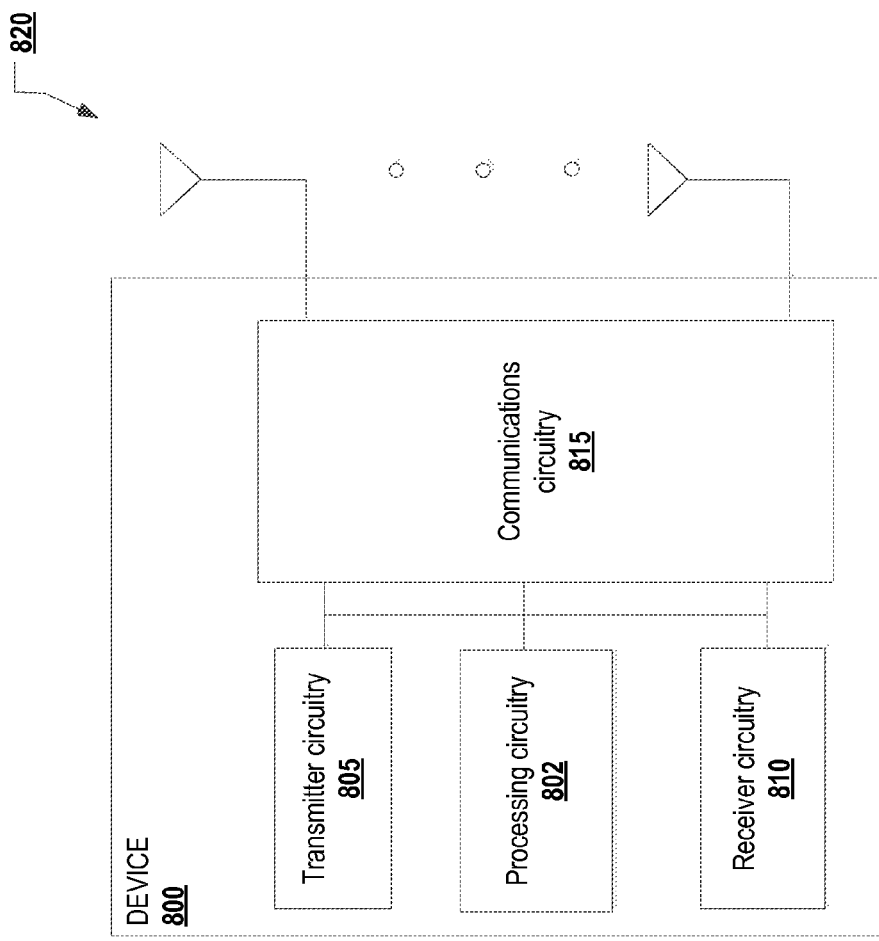
FIG. 8 is a block diagram illustrating a transmitting and receiving device, in accordance with various embodiments.

FIG. 8 illustrates a device 800 in accordance with some embodiments. The device 800 may be similar to and/or included in one or more of the element manager 105 and/or one of the WLAN APs 130-135 of FIG. 1 and/or the network manager 220 of FIG. 2 and described herein. The device 800 may include processing circuitry 802, transmitter circuitry 805, receiver circuitry 810, communications circuitry 815, and one or more antennas 820 coupled with each other at least as shown.

Briefly, the communications circuitry 815 may be coupled with the antennas 820 to facilitate over-the-air communication of signals to/from the device 800. Operations of the communications circuitry 815 may include, but are not limited to, filtering, amplifying, storing, modulating, demodulating, transforming, etc.

The transmitter circuitry 805 may be coupled with the communications circuitry 815 and may be configured to provide signals to the communications circuitry 815 for transmission by the antennas 820. In various embodiments, the transmitter circuitry 805 may be configured to provide various signal processing operations on the signal to provide the signal to the communications circuitry 815 with appropriate characteristics. In some embodiments, the transmitter circuitry 805 may be adapted to generate signals. Further, the transmitter circuitry 805 may be adapted to scramble, multiplex, and/or modulate various signals prior to transmission by the communications circuitry 815.

The receiver circuitry 810 may be coupled with the communications circuitry 815 and may be configured to receive signals from the communications circuitry 815. In some embodiments, the receiver circuitry 810 may be adapted to generate signals. Further, the receiver circuitry 810 may be adapted to descramble, de-multiplex, and/or demodulate various signals following reception by the communications circuitry 815.

The processing circuitry 802 may be coupled with the transmitter circuitry 805, the receiver circuitry 810, and/or the communications circuitry 815. The processing circuitry 802 may be adapted to perform operations described herein with respect to an element manager, a network manager, and/or a WLAN AP. In some embodiments, the processing circuitry 802 may be adapted to generate, process, and/or manipulate data that is to be transmitted over the air or over an electrical connection (e.g., a network), e.g., to and/or from an element manager, a network manager, and/or a WLAN AP.

Some or all of the communications circuitry 815, transmitter circuitry 805, and/or receiver circuitry 810 may be included in, for example, a communication chip and/or communicatively coupled with a printed circuit board as described with respect to FIG. 7.

In various embodiments, example 1 may be an apparatus to be included in a communication device, the apparatus comprising: processing circuitry to determine an identification value for a neighbor awareness networking (NAN) cluster and to generate a discovery beacon that includes the identification value in a first field that is associated with a transmitter address, wherein the discovery beacon includes a second field associated with a cluster identifier; and transmitter circuitry, coupled with the processing circuitry, to transmit the discovery beacon using a channel associated with the NAN cluster to join the NAN cluster. Example 2 may include the apparatus of example 1, wherein the NAN cluster is hidden such that the NAN cluster is not advertised. Example 3 may include the apparatus of example 1, wherein the processing circuitry is to include a random value in the second field. Example 4 may include the apparatus of example 1, wherein the processing circuitry is to include a broadcast address in a third field of the discovery beacon, and wherein the third field is associated with a receiver address. Example 5 may include the apparatus of any of examples 1-4, further comprising: receiver circuitry, coupled with the processing circuitry, to receive a synchronization beacon from another communication device, wherein the processing circuitry is to acquire timing information associated with the NAN cluster based on the synchronization beacon. Example 6 may include the apparatus of example 5, wherein the processing circuitry is to adjust a discovery window based on the timing information, wherein the discovery window is associated with at least one of channel information and the timing information for communication in the NAN cluster by the communication device. Example 7 may include the apparatus of example 5, wherein the transmitter circuitry is to transmit a plurality of discovery beacons having the identification value in respective first address fields, and wherein the processing circuitry is to cause the transmitter circuitry to stop transmitting discovery beacons based on the reception of the synchronization beacon. Example 8 may include the apparatus of any of examples 1-4, wherein the timing information comprises a timestamp. Example 9 may include the apparatus of any of examples 1-4, wherein the processing circuitry is to determine the identification value based on an application, stored in the communication device, that is associated with the NAN cluster.

In various embodiments, example 10 may be an apparatus to be included in a communication device, the apparatus comprising: receiver circuitry to receive, from another communication device, a discovery beacon associated with a neighbor awareness networking (NAN) cluster to which the communication device is connected, the discovery beacon to include an identification value associated with the NAN cluster in a first field; processing circuitry to determine timing information associated with the NAN cluster and to generate a synchronization beacon that includes the timing information; and transmitter circuitry, coupled with the processing circuitry, to transmit the synchronization beacon based on the discovery beacon. Example 11 may include the apparatus of example 10, wherein the NAN cluster is hidden such that the NAN cluster is not advertised. Example 2 may include the apparatus of example 10, wherein the first field of the discovery beacon is associated with an address of a transmitter of a discovery beacon, and wherein the discovery beacon includes another field associated with identification of a NAN cluster. Example 13 may include the apparatus of example 10, wherein processing circuitry is to schedule at least one time slot for transmission of the synchronization beacon based the discovery beacon and is to cause the transmitter circuitry to transmit the synchronization beacon based on the scheduling. Example 14 may include the apparatus of example 13, wherein the time slot is associated with a Further NAN Service Discovery Attribute or a Further Availability Map Attribute. Example 15 may include the apparatus of example 13, wherein the time slot does not overlap in time with a discovery window associated with communication in the NAN cluster. Example 16 may include the apparatus of any of examples 10-15, wherein the receiver circuitry is to receive the discovery beacon via a channel associated with NAN, and wherein the transmitter circuitry is to transmit the synchronization beacon via the channel. Example 17 may include the apparatus of example 16, wherein the processing circuitry is to passively scan the channel for the discovery beacon. Example 18 may include the apparatus of example 17, wherein the processing circuitry is to passively scan the channel at a predefined interval.

In various embodiments, example 19 may be one or more non-transitory computer-readable media comprising computing device-executable instructions, wherein the instructions, in response to execution by a computing system, cause the computing system to: generate a discovery beacon associated with a neighbor awareness network (NAN) that includes an identifier in a first field that is associated with a transmitter address of a discovery beacon, wherein the discovery beacon includes a second field associated with a cluster identifier; transmit the discovery beacon using a channel associated with the NAN so that the computing system can join a hidden cluster associated with the NAN; and receive a synchronization beacon from another computing system that includes timing information associated with the hidden cluster. Example 20 may include the one or more non-transitory computer-readable media of example 19, wherein the discovery beacon is further to include a random value in a second field, and wherein the discovery beacon is to include, in a third field, an indication of a discovery window associated with at least one of transmission or reception of data in the NAN. Example 21 may include the one or more non-transitory computer-readable media of example 20, wherein the instructions are to cause the computing system to: change the discovery window based on the synchronization beacon. Example 22 may include the one or more non-transitory computer-readable media of any of examples 19-21, wherein the instructions are to cause the computing system to transmit a plurality of discovery beacons until the reception of the synchronization beacon.

In various embodiments, example 23 may be a computer-implemented method comprising: receiving, from a communication device, a discovery beacon associated with a hidden neighbor awareness networking (NAN) cluster that includes an identifier associated with the NAN cluster in a first field; generating a synchronization beacon or an action frame that includes first timing information to be used for joining the hidden NAN cluster; and transmitting, to the other communication device, the synchronization beacon or the action frame based on the discovery beacon. Example 24 may include the method of example 23, further comprising: scheduling a time slot for the transmitting of the synchronization beacon or the action frame based on an indication of second timing information that is included in the discovery beacon. Example 25 may include the method of any of examples 23-25, further comprising: scanning, at a predetermined interval, a channel associated with NAN for the discovery beacon.

In various embodiments, example 26 may be a method comprising: determining an identification value for a neighbor awareness networking (NAN) cluster; generating a discovery beacon that includes the identification value in a first field that is associated with a transmitter address, wherein the discovery beacon includes a second field associated with a cluster identifier; and transmitting the discovery beacon using a channel associated with the NAN cluster to join the cluster. Example 27 may include the method of example 26, wherein the NAN cluster is hidden such that the NAN cluster is not advertised through discovery beacons. Example 28 may include the method of example 26, further comprising: including a random value in the second field of the discovery beacon. Example 29 may include the method of example 26, further comprising: including a broadcast address in a third field of the discovery beacon, wherein the third field is associated with a receiver address. Example 30 may include the method of any of examples 26-29, further comprising: receiving a synchronization beacon from another communication device; and acquiring timing information associated with the NAN cluster based on the synchronization beacon. Example 31 may include the method of example 30, further comprising: adjusting a discovery window based on the timing information, wherein the discovery window is associated with at least one of channel information and the timing information for communication in the NAN cluster by the communication device. Example 32 may include the method of example 30, further comprising: transmitting a plurality of discovery beacons having the identification value in respective first address fields until the receiving of the synchronization beacon. Example 33 may include the method of any of examples 26-29, wherein the timing information comprises a timestamp. Example 34 may include the method of any of examples 26-29, wherein the determining of the identification value is based on an application that is associated with the NAN cluster.

In various embodiments, example 35 may be one or more non-transitory computer-readable media comprising computing device-executable instructions, wherein the instructions, in response to execution by a computing system, cause the computing system to: receive, from another communication device, a discovery beacon associated with a neighbor awareness networking (NAN) cluster to which the computing system is connected, the discovery beacon to include an identification value associated with the NAN cluster in a first field; determine timing information associated with the NAN cluster; generate a synchronization beacon that includes the timing information; and transmit the synchronization beacon based on the discovery beacon. Example 36 may include the one or more non-transitory computer-readable media of example 35, wherein the NAN cluster is hidden such that the NAN cluster is not advertised through discovery beacons. Example 37 may include the one or more non-transitory computer-readable media of example 35, wherein the first field of the discovery beacon is associated with an address of a transmitter of a discovery beacon, and wherein the discovery beacon includes another field associated with identification of a NAN cluster. Example 38 may include the one or more non-transitory computer-readable media of example 35, wherein the instructions further cause the computing system to schedule at least one time slot for the transmitting of the synchronization beacon based the discovery beacon.

In various embodiments, example 39 may be an apparatus comprising: means for determining an identification value for a neighbor awareness networking (NAN) cluster; means for generating a discovery beacon that includes the identification value in a first field that is associated with a transmitter address, wherein the discovery beacon includes a second field associated with a cluster identifier; and means for transmitting the discovery beacon using a channel associated with the NAN cluster to join the cluster.

In various embodiments, example 40 may an apparatus to be included in a communication device, the apparatus comprising: means for receiving, from another communication device, a discovery beacon associated with a neighbor awareness networking (NAN) cluster to which the communication device is connected, the discovery beacon to include an identification value associated with the NAN cluster in a first field; means for determining timing information associated with the NAN cluster; means for generating a synchronization beacon that includes the timing information; and means for transmitting the synchronization beacon based on the discovery beacon.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus comprising:
   processing circuitry to determine an identification value for a neighbor awareness networking (NAN) cluster and to generate a discovery beacon that includes the identification value in a first field that is associated with a transmitter address, wherein the discovery beacon includes a second field associated with a cluster identifier; and
   transmitter circuitry, coupled with the processing circuitry, to wirelessly transmit the discovery beacon using a channel associated with the NAN cluster to join the NAN cluster,
   wherein the NAN cluster is hidden such that the NAN cluster is not advertised through discovery beacons.

2. The apparatus of claim 1, wherein the processing circuitry is to include a random value in the second field.

3. The apparatus of claim 1, wherein the processing circuitry is to include a broadcast address in a third field of the discovery beacon, and wherein the third field is associated with a receiver address.

4. The apparatus of claim 1, further comprising:
   receiver circuitry, coupled with the processing circuitry, to receive a synchronization beacon from a communication device, wherein
   the processing circuitry is to acquire timing information associated with the NAN cluster based on the synchronization beacon.

5. The apparatus of claim 4, wherein the processing circuitry is to adjust a discovery window based on the timing information, wherein the discovery window is associated with at least one of channel information and the timing information for communication in the NAN cluster by the communication device.

6. The apparatus of claim 4, wherein the transmitter circuitry is to transmit a plurality of discovery beacons having the identification value in respective first address fields, and wherein the processing circuitry is to cause the transmitter circuitry to stop transmitting discovery beacons based on the reception of the synchronization beacon.

7. The apparatus of claim 4, wherein the timing information comprises a timestamp.

8. The apparatus of claim 4, wherein the processing circuitry is to determine the identification value based on an application, stored in the communication device, that is associated with the NAN cluster.

9. An apparatus comprising:
   receiver circuitry to receive, from a communication device, a discovery beacon associated with a neighbor awareness networking (NAN) cluster to which the apparatus is connected and the communication device seeks to join, the discovery beacon to include an identification value associated with the NAN cluster in a first field;
   processing circuitry to determine timing information associated with the NAN cluster and to generate a synchronization beacon that includes the timing information; and
   transmitter circuitry, coupled with the processing circuitry, to wirelessly transmit the synchronization beacon based on the discovery beacon,
   wherein the NAN cluster is hidden such that the NAN cluster is not advertised.

10. The apparatus of claim 9, wherein the first field of the discovery beacon is associated with an address of a transmitter of a discovery beacon, and wherein the discovery beacon includes another field associated with identification of the NAN cluster.

11. The apparatus of claim 9, wherein the processing circuitry is to schedule at least one time slot for transmission of the synchronization beacon based on the discovery beacon and is to cause the transmitter circuitry to transmit the synchronization beacon based on the scheduling.

12. The apparatus of claim 11, wherein the time slot is associated with a Further NAN Service Discovery Attribute or a Further Availability Map Attribute.

13. The apparatus of claim 11, wherein the time slot does not overlap in time with a discovery window associated with communication in the NAN cluster.

14. The apparatus of claim 9, wherein the receiver circuitry is to receive the discovery beacon via a channel associated with NAN, and wherein the transmitter circuitry is to transmit the synchronization beacon via the channel.

15. The apparatus of claim 14, wherein the processing circuitry is to passively scan the channel for the discovery beacon.

16. The apparatus of claim 15, wherein the processing circuitry is to passively scan the channel at a predefined interval.

17. One or more non-transitory computer-readable media comprising computing device-executable instructions, wherein the instructions, in response to execution by a computing system, cause the computing system to:
   generate a discovery beacon associated with a neighbor awareness network (NAN) that includes an identifier in a first field that is associated with a transmitter address of a discovery beacon, wherein the discovery beacon includes a second field associated with a cluster identifier; and
   wirelessly transmit the discovery beacon using a channel associated with the NAN so that the computing system can join a hidden cluster associated with the NAN;
   receive a synchronization beacon from another computing system that includes timing information associated with the hidden cluster.

18. The one or more non-transitory computer-readable media of claim 17, wherein the discovery beacon is further to include a random value in a second field, and wherein the discovery beacon is to include, in a third field, an indication of a discovery window associated with at least one of transmission or reception of data in the NAN.

19. The one or more non-transitory computer-readable media of claim 18, wherein the instructions are to cause the computing system to:
   change the discovery window based on the synchronization beacon.

20. The one or more non-transitory computer-readable media of claim 17, wherein the instructions are to cause the computing system to transmit a plurality of discovery beacons until the reception of the synchronization beacon.

21. A computer-implemented method comprising:
   receiving, from a communication device, a discovery beacon associated with a hidden neighbor awareness networking (NAN) cluster that includes an identifier associated with the NAN cluster in a first field;

generating a synchronization beacon or an action frame that includes first timing information to be used by the communication device for joining the hidden NAN cluster; and wirelessly transmitting, to the communication device, the synchronization beacon or the action frame based on the discovery beacon.

22. The method of claim 21, further comprising:

scheduling a time slot for the transmitting of the synchronization beacon or the action frame based on an indication of second timing information that is included in the discovery beacon.

23. The method of claim 21, further comprising:

scanning, at a predetermined interval, a channel associated with NAN for the discovery beacon.

* * * * *